(12) United States Patent
Murata et al.

(10) Patent No.: US 8,582,273 B2
(45) Date of Patent: Nov. 12, 2013

(54) SURGE ABSORBING CIRCUIT AND ELECTRIC DEVICE USING THE SAME

(75) Inventors: Yuichiro Murata, Tokyo (JP); Yasushi Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/574,884

(22) PCT Filed: Oct. 12, 2010

(86) PCT No.: PCT/JP2010/067864
§ 371 (c)(1),
(2), (4) Date: Jul. 24, 2012

(87) PCT Pub. No.: WO2011/104922
PCT Pub. Date: Sep. 1, 2011

(65) Prior Publication Data
US 2012/0320489 A1    Dec. 20, 2012

(30) Foreign Application Priority Data
Feb. 26, 2010    (JP) .................................. 2010-042684

(51) Int. Cl.
| H01C 7/12 | (2006.01) |
| H02H 1/00 | (2006.01) |
| H02H 1/04 | (2006.01) |
| H02H 3/22 | (2006.01) |
| H02H 9/06 | (2006.01) |

(52) U.S. Cl.
USPC ............................. 361/118; 361/111; 361/119

(58) Field of Classification Search
USPC ......................................................... 361/118
See application file for complete search history.

(56) References Cited

U.S. PATENT DOCUMENTS 5,493,469 A * 2/1996 Lace .............................. 361/119
8,208,275 B2 * 6/2012 Goins et al. ...................... 363/53

FOREIGN PATENT DOCUMENTS

| JP | 64 55873 | 3/1989 |
| JP | 64 55742 | 4/1989 |
| JP | 6 70442 | 9/1994 |
| JP | 2000 50486 | 2/2000 |
| JP | 2007 315789 | 12/2007 |

OTHER PUBLICATIONS

International Search Report Issued Jan. 18, 2011 in PCT/JP10/67864 Filed Oct. 12, 2010.

* cited by examiner

*Primary Examiner* — Dharti Patel
(74) *Attorney, Agent, or Firm* — Oblon, Spivak, McClelland, Maier & Neustadt, L.L.P.

(57)    ABSTRACT

A surge absorbing circuit capable of absorbing surge stably without affecting a signal on a signal line even in the case of a high frequency signal, and an electronic device using the surge absorbing circuit. The surge absorbing circuit includes at least one surge suppression circuit, the at least one surge suppression circuit including, with respect to the same signal line at least: a power supply; a diode connected between the signal line and the power supply; and a power supply line for connecting the diode and the power supply to each other. In each of the at least one surge suppression circuit, a direction of the diode and a voltage of the power supply with respect to the signal line are determined so that the diode is reversely biased.

20 Claims, 8 Drawing Sheets

SURGE VOLTAGE AND PROTECTABLE REGION OF IC

SURGE ABSORBING CIRCUIT AND ELECTRIC DEVICE USING THE SAME

TECHNICAL FIELD

The present invention relates to a circuit technology for absorbing surge.

BACKGROUND ART

Conventionally, in order to protect a device from high voltage such as high voltage lightning surge, switching surge, or static electricity that enters through a signal line or a power supply line, there have been widely used a varistor formed of a high resistive element having nonlinear voltage characteristics and an arrester having a discharge gap accommodated in a tight container. In the case of a low voltage signal line, a suppression voltage of the varistor or the arrester cannot be set to be as low as about several volts, and therefore a Zener diode capable of setting the suppression voltage to be lower is used between signal lines as a surge protector (for example, Patent Literatures 1 and 2 below).

CITATION LIST

Patent Literature

[PTL 1] JP 2003-11270 A
[PTL 2] WO 2007/088932 A1
[PTL 3] JP 60-253256 A
[PTL 4] JP 2001-156256 A
[PTL 5] JP 07-22120 A
[PTL 6] JP 2000-50486 A

SUMMARY OF INVENTION

Technical Problems

In such a surge absorbing circuit, restrictions are imposed on a surge waveform that can actually be suppressed, depending on the characteristics of a nonlinear voltage element. In the case of suppressing a surge waveform induced in a high frequency signal line of several tens of MHz or more, a surge absorbing circuit using a varistor can suppress the surge waveform because the varistor has a large electrostatic capacitance of several hundreds of pF, but the high frequency signal is lowered and necessary sensitivity cannot be obtained. In a surge absorbing circuit using an arrester, the arrester has a small electrostatic capacitance of several pF and hence the high frequency signal is not lowered. However, a suppression voltage with respect to a surge waveform having a risetime of several tens of ns is about several hundreds of V, and hence the high frequency surge waveform cannot be suppressed enough. In a surge absorbing circuit using a Zener diode, the electrostatic capacitance is as large as several hundreds of pF, and hence the high frequency signal is lowered and necessary sensitivity cannot be obtained. As described above, the surge absorbing circuit used in a high frequency signal line has a problem in that, when the surge waveform has a frequency component which is substantially equal to the frequency of the high frequency signal, the high frequency signal is also reduced for reducing the high voltage surge waveform.

In order to solve this point, for example, in Patent Literature 1 above, a Zener diode and a diode are used in combination to reduce the electrostatic capacitance. In this case, until one Zener diode is turned ON to suppress a surge voltage, the other diode is applied with the surge voltage in the reverse direction. Accordingly, there has been a problem that, depending on fluctuations in Zener voltage, the applied surge voltage exceeds a reverse breakdown voltage of the diode and the diode is broken down.

Patent Literature 2 above proposes a surge absorbing circuit that uses an arrester and a varistor in combination. The arrester and the varistor are connected to a neutral point, and hence there are advantages that the number of varistors can be reduced and the breakdown voltage of the varistor can be lowered. However, the electrostatic capacitance of the varistor cannot be reduced, and hence there has been a problem that the surge absorbing circuit cannot be used for a high frequency signal line.

In Patent Literature 3 above, a protection circuit including a positive power supply, a diode, and a capacitor is provided inside an integrated circuit (IC), to thereby reduce the electrostatic capacitance. In this case, there has been a problem that a surge current flowing through the capacitor flows into an internal circuit of the IC via an internal parasitic capacitance of the IC to damage the circuit. Further, there has been another problem that there is no diode or capacitor connected to a negative power supply and hence, when a negative surge voltage is applied, the applied surge voltage exceeds a reverse breakdown voltage of the diode and the diode is damaged.

In Patent Literature 4 above, a protection circuit including a diode disposed between a positive power supply and a signal line and a diode disposed between the signal line and the ground is provided inside an IC, to thereby allow a surge current to flow to the positive power supply or the ground to suppress a surge voltage. In this case, the surge current flowing through the diode flows to the positive power supply (Vcc) and part thereof flows also to the ground via an internal circuit, and hence there has been a problem that the internal circuit of the IC is damaged.

In Patent Literature 5 above, a protection circuit including a diode disposed between a positive power supply and a signal line and a diode disposed between the signal line and the ground is provided inside a connector, to thereby suppress a surge voltage. In this case, the diodes are provided inside the connector, and hence there has been a problem that electrostatic noise or a surge voltage generated during the attachment/detachment of the connector cannot be suppressed. Further, there has been another problem that an overshoot voltage of a suppression voltage waveform becomes higher to exceed a reverse breakdown voltage and the diode is damaged.

Patent Literature 6 above discloses the same protection circuit as in Patent Literature 4. A surge current flowing through a diode flows to a power supply (Vdd) and part thereof flows also to the ground via an IC, and hence there has been a problem that an internal circuit of the IC is damaged.

The present invention has been made in order to solve the above-mentioned problems, and has an object to provide a surge absorbing circuit capable of absorbing surge stably without affecting a signal on a signal line even in the case of a high frequency signal, and also provide an electronic device using the surge absorbing circuit.

Solution to Problems

According to the present invention, there is provided a surge absorbing circuit, including at least one surge suppression circuit, the at least one surge suppression circuit including, with respect to the same signal line, at least: a power supply; a diode connected between the signal line and the power supply; and a power supply line for connecting the diode and the power supply to each other, in which, in each of the at least one surge suppression circuit, a direction of the diode and a voltage of the power supply with respect to the signal line are determined so that the diode is reversely biased. Further, there is provided an electronic device using the surge absorbing circuit.

Advantageous Effects of Invention

According to the present invention, it is possible to provide the surge absorbing circuit capable of absorbing surge stably without affecting the signal even in the case of the high frequency signal, and also provide the electronic device using the surge absorbing circuit.

DESCRIPTION OF EMBODIMENTS

A surge absorbing circuit according to the present invention includes a diode which is connected between a signal line and a power supply so as to be applied with a reverse bias, and a capacitor which is connected between the diode and the ground.

In the present invention, by the diode which is connected so as to be applied with the reverse bias, an electrostatic capacitance between the signal line and the ground is set to an extremely small value, and a surge suppression voltage is determined based on a power supply voltage. Therefore, the surge suppression voltage can be maintained to a constant value irrespective of element characteristics, and hence the surge suppression voltage can be prevented from exceeding a reverse breakdown voltage of the diode to damage the diode. In addition, the capacitor is used to suppress a surge waveform, and hence the voltage can be suppressed even against a surge waveform having a fast risetime.

Further, the positional relationship among the capacitor, an IC, and a frame ground (FG) formed of a metal casing is determined so that a surge current flowing through the capacitor may flow to the frame ground reliably. Therefore, the surge current can be prevented from flowing into the IC via the ground to damage an internal circuit of the IC.

Hereinafter, a surge absorbing circuit and the like of the present invention are described by way of embodiments with reference to the drawings. Note that, in the embodiments, the same or corresponding parts are denoted by the same reference symbols, and overlapping descriptions thereof are omitted.

First Embodiment

Figure 1:
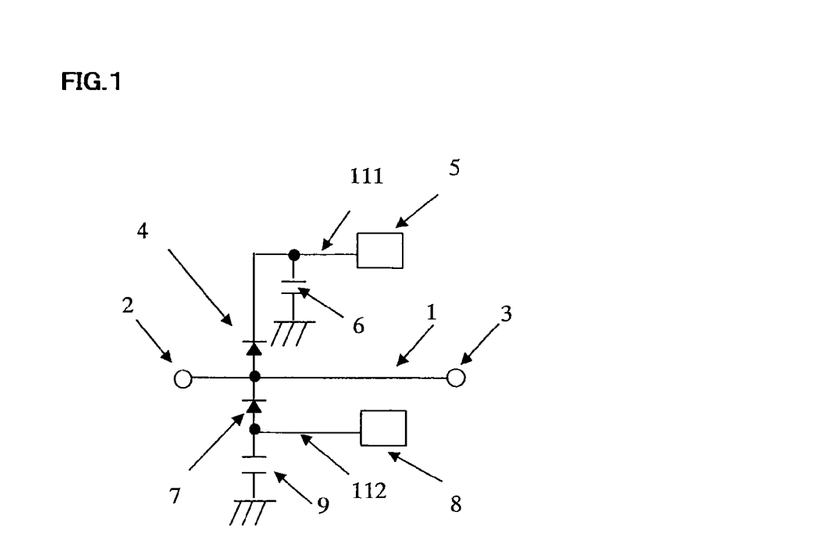
FIG. 1 A diagram illustrating a configuration of a surge absorbing circuit according to a first embodiment of the present invention.

FIG. 1 is a diagram illustrating a configuration of a surge absorbing circuit according to a first embodiment of the present invention. In FIG. 1, a signal line 1 includes an input terminal 2 and an output terminal 3 on both ends thereof. A first diode 4 has an anode connected to the signal line 1 and a cathode connected to a positive power supply 5 via a power supply line 111 so that a reverse bias is applied from the positive power supply 5. A first capacitor 6 is connected between the ground and a connection point on the power supply line 111 between the cathode of the first diode 4 and the positive power supply 5 so as to be closest to the first diode 4.

A second diode 7 has an anode connected to a negative power supply 8 via a power supply line 112 and a cathode connected to the signal line 1 (for example, the same position as the position of the signal line 1 connected to the anode of the first diode 4) so that a reverse bias is applied from the negative power supply 8. Note that, for the easy understanding of the relationship of connection directions, the direction of the anode and cathode of the second diode 7 and the direction of those of the first diode 4 are described as the same direction in the following. A second capacitor 9 is connected between the ground and a point on the power supply line 112 between the anode of the second diode 7 and the negative power supply 8 so as to be closest to the second diode 7.

Note that, the first diode 4, the positive power supply 5, the first capacitor 6, and the power supply line 111 form a surge suppression circuit, and the second diode 7, the negative power supply 8, the second capacitor 9, and the power supply line 112 form a surge suppression circuit.

The surge absorbing circuit of FIG. 1 including the positive power supply side surge suppression circuit and the negative power supply side surge suppression circuit is mounted as a surge absorbing circuit 48 on, for example, each of an input circuit 42 and an output circuit 43 of a control device 41 for controlling a device to be controlled 31 included in an electronic device of FIG. 9 to be described later. Each of the input circuit 42 and the output circuit 43 includes an input/output IC 47. When the surge absorbing circuit is mounted on the input circuit 42, the direction of signal transmission is a direction from a sensor circuit 32 of the device to be controlled 31 to a control circuit 44 of the control device 41. Accordingly, the sensor circuit 32 of the device to be controlled 31 is connected to the input terminal 2, and the control circuit 44 side of the control device 41 is connected to the output terminal 3 via the input/output IC 47. On the other hand, when the surge absorbing circuit is mounted on the output circuit 43, the direction of signal transmission is a direction from the control circuit 44 of the control device 41 to a drive device 33 of the device to be controlled 31. Accordingly, the control circuit 44 side of the control device 41 is connected to the input terminal 2 via the input/output IC 47, and the drive device 33 of the device to be controlled 31 is connected to the output terminal 3.

Note that, the surge absorbing circuit functions irrespective of the direction of the signal flowing through the signal line 1. Accordingly, the surge absorbing circuit functions in the same manner even when the input terminal 2 and the output terminal 3 of the signal line 1 on both ends thereof are replaced with each other. Note that, in the following, for convenience of description, the terminals are described as the input terminal 2 and the output terminal 3.

Further, the surge absorbing circuit according to the present invention is not limited to the above-mentioned example, and can exert the function of absorbing surge by being connected to various circuits, such as ICs (integrated circuit portion, integrated circuit package) having various functions (the same shall apply hereinafter).

Next, the operation of the surge absorbing circuit of FIG. 1 is described. The first diode 4 is biased by the positive power supply 5 in the reverse direction and is therefore normally in an "OFF" state. Accordingly, the first capacitor 6 is not connected to the signal line 1, and hence a high frequency signal applied to the input terminal 2 is transmitted to the output terminal 3 without attenuation and is output. When a positive surge voltage exceeding the voltage of the positive power supply 5 is applied to the input terminal 2, the first diode 4 is biased in the forward direction and therefore becomes an "ON" state. In this case, the first capacitor 6 enters the state of being connected to the signal line 1, and hence a positive surge waveform (current, voltage) is absorbed in a path that reaches the ground via the first diode 4 and the first capacitor 6.

Further, the second diode 7 is biased by the negative power supply 8 in the reverse direction and is therefore normally in an "OFF" state. Accordingly, the second capacitor 9 is not connected to the signal line 1, and hence a high frequency signal applied to the input terminal 2 is output to the output terminal 3 without attenuation. When a negative surge voltage exceeding the voltage of the negative power supply 8 is applied to the input terminal 2, the second diode 7 is biased in the forward direction and therefore becomes an "ON" state. In this case, the second capacitor 9 enters the state of being connected to the signal line 1, and hence a negative surge waveform (current, voltage) is absorbed in a path that reaches the ground via the second diode 7 and the second capacitor 9.

The path that reaches the ground via the diode and the capacitor is described in little bit more detail. In a Schottky barrier diode having good high frequency characteristics, the impedance when the diode is biased in the forward direction to be turned "ON" is about 1Ω at 1 MHz or less, about 3Ω at 10 MHz, about 5Ω at 100 MHz, and about 10Ω at 1 GHz. Therefore, when the impedance between the diode and the ground is set to be several ohms or less, the surge voltage can be reduced enough. Accordingly, it is necessary to mount the capacitor between the diode and the ground so that the capacitor has the impedance as low as possible. It should be understood that the surge voltage suppression effect is significantly enhanced in the case where the ground to be connected to the capacitor is a place having a stable potential such as a frame ground of a metal casing.

Figure 2:
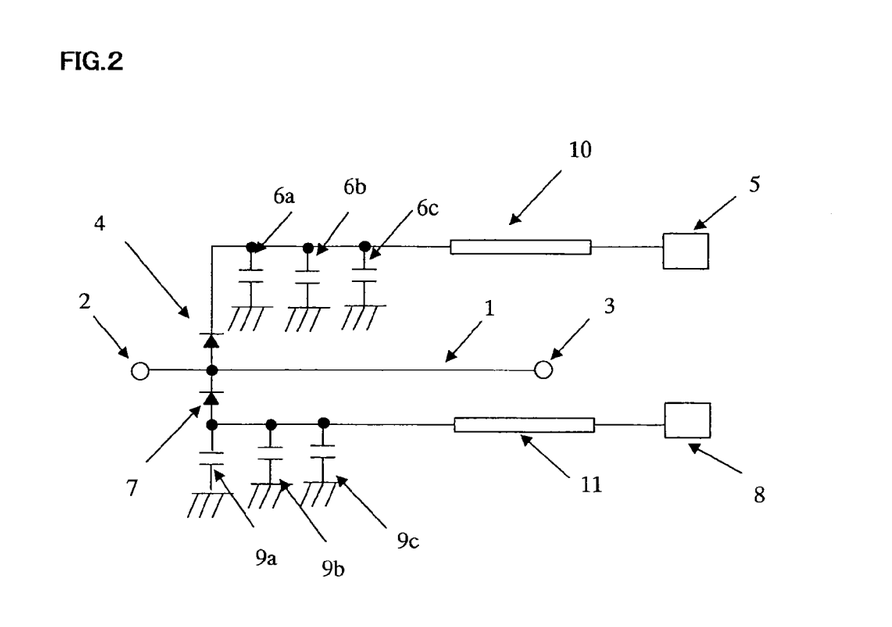
FIG. 2 A diagram for describing a method of mounting capacitors in the present invention.

FIG. 2 illustrates a method of mounting the capacitors in the present invention. In FIG. 2, reference symbols 6a, 6b, and 6c denote first capacitors connected in parallel to the positive power supply circuit, and reference symbols 9a, 9b, and 9c denote second capacitors connected in parallel to the negative power supply circuit. Reference numeral 10 denotes a power supply pattern constituting a power supply line of a circuit board of, for example, the control device 41 of FIG. 9, which connects the positive power supply 5 and the first capacitors 6a, 6b, and 6c to each other. Reference numeral 11 denotes a power supply pattern constituting a power supply line of the circuit board, which connects the negative power supply 8 and the second capacitors 9a, 9b, and 9c to each other.

A surge voltage generated by induced lightning, static electricity discharge, or switching surge of an electric power device has a frequency component in a wide range of 0.1 MHz to several hundreds of MHz, and hence it is necessary to reduce the impedance in a wide range of frequency band. It is therefore necessary to mount capacitors having different capacitances in parallel or mount a capacitor on the power supply pattern of the circuit board on the diode side. The reason is that the equivalent inductance of the power supply pattern is about several tens of nH and the impedance is about 10Ω at 100 MHz and hence, if the diode is mounted on the power supply pattern on the power supply side, the surge waveform (current, voltage) cannot be absorbed enough.

Figure 3:
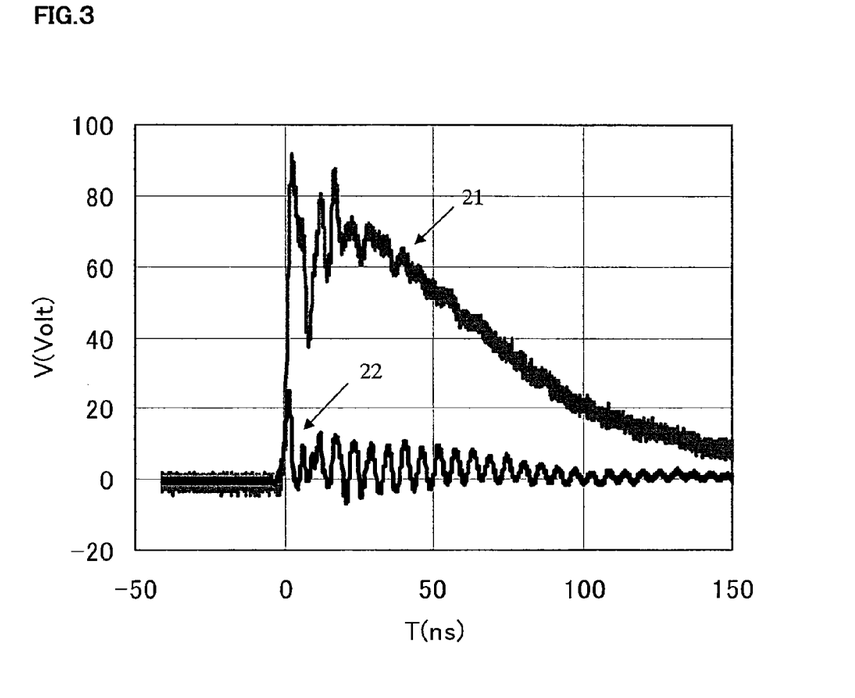
FIG. 3 A graph for describing an effect of suppressing a surge voltage by the surge absorbing circuit of the present invention.

FIG. 3 shows the surge voltage suppression effect obtained by the surge absorbing circuit of the present invention. FIG. 3 shows a change in voltage V in accordance with time T. Reference numeral 21 denotes an input surge waveform and reference numeral 22 denotes an output waveform. A Schottky barrier diode was used as a diode, and a chip capacitor of 1 µF was used as a capacitor. The input surge waveform 21 has a risetime of several ns and a maximum amplitude of 80 V. The amplitude of the output waveform 22, on the other hand, is suppressed to 20 V. The Schottky barrier diode had a reverse breakdown voltage of about 50 V, and hence the surge voltage was able to be suppressed without damaging the Schottky barrier diode. In addition, when a high frequency signal not exceeding the positive voltage and the negative voltage was applied to the circuit, the amount of signal attenuation up to 500 MHz was 1 dB or less, which was an allowable level.

Figure 4:
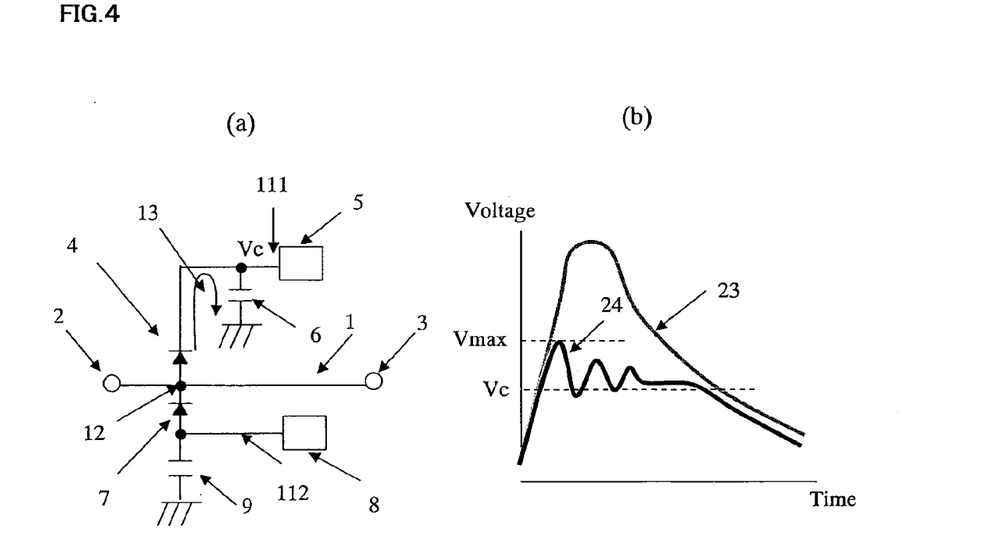
FIG. 4 Diagrams for describing a relationship between a surge suppression voltage and a reverse breakdown voltage of a diode in the surge absorbing circuit of the present invention.

The surge voltage suppression waveform is described in little bit more detail. Referring to FIG. 4, the relationship between the surge suppression voltage and the reverse breakdown voltage of the diode in the surge absorbing circuit of the present invention is described. FIG. 4(a) schematically illustrates the surge absorbing circuit of FIG. 1. FIG. 4(b) schematically shows a voltage waveform at a diode connection point 12 of the signal line 1 of FIG. 4(a). In FIG. 4(b), reference numeral 23 denotes an input surge waveform and reference numeral 24 denotes an output waveform. When a voltage of the positive input surge waveform 23 becomes larger than a voltage Vc of the positive power supply 5, the first diode 4 is turned "ON", and the surge waveform is absorbed in a path 13. In this case, the surge waveform becomes an oscillatory waveform determined by the resonance frequency of the path 13, and the output voltage generates an overshoot to be higher than the positive power supply voltage Vc, with the result that a maximum voltage Vmax of the output waveform becomes higher than the positive power supply voltage Vc.

The maximum voltage Vmax is applied to the second diode 7 in the reverse direction. Accordingly, if the maximum voltage Vmax exceeds the reverse breakdown voltage of the diode, the second diode 7 is broken down. When the second diode 7 is broken down in a short-circuit mode, the second capacitor 9 is connected directly to the signal line 1 and the high frequency signal is attenuated to cause a problem. When the second diode 7 is broken down in an open-circuit mode, a negative surge waveform cannot be absorbed to cause a problem. The maximum voltage Vmax is determined by the voltage Vc and the overshoot determined by the resonance frequency of the path 13.

In order to reduce the overshoot, it is effective to connect the capacitors (first and second capacitors 6a to 6c and 9a to 9c) in parallel or connect the capacitors on the diode side of the power supply patterns 10 and 11 as illustrated in FIG. 2. In the case where the maximum voltage Vmax exceeds the reverse breakdown voltage of the diode even after the overshoot is reduced by the method described above, it is possible to adjust the positive power supply voltage Vc to set the maximum voltage Vmax so as to prevent the maximum voltage Vmax from exceeding the reverse breakdown voltage finally.

In this way, a highly-reliable surge absorbing circuit capable of preventing a diode from being damaged by an overshoot of the surge suppression voltage can be obtained. On the other hand, in the surge absorbing circuit described in the conventional example that uses an arrester, a varistor, or a Zener diode, the overshoot is determined only by the characteristics of the element, and hence if the overshoot exceeds the reverse breakdown voltage due to fluctuations in element characteristics, final adjustment cannot be performed.

Even when a negative surge waveform is applied, the same operation is performed with respect to the second diode 7 and the second capacitor 9, and hence description thereof is omitted.

In conclusion, the present invention can attenuate a surge voltage waveform resulting from induced lightning, static electricity discharge, or switching surge that is induced in a high frequency signal line. In particular, a surge waveform having the same frequency component as that of the frequency of the high frequency signal can also be attenuated without affecting the high frequency signal. Further, the surge suppression voltage can be adjusted based on the voltages of the positive power supply and the negative power supply, and hence the overshoot of the surge suppression waveform can be set so as not to exceed the reverse breakdown voltage of the diode. Thus, a highly-reliable surge absorbing circuit capable of preventing a diode from being damaged by an overshoot of the surge suppression voltage can be obtained.

In Patent Literature 3 above, the IC input protection circuit including the positive power supply, the diode, and the capacitor is disclosed, and hence there has been a problem that, when a negative surge voltage is applied, the surge waveform cannot be absorbed and also the applied surge voltage exceeds the reverse breakdown voltage of the diode to damage the diode. According to the present invention, the overshoot voltage of the surge suppression waveform can be freely adjusted. Therefore, in addition to the effect of suppressing both the positive and negative surge waveforms, there is an advantageous effect that the damage of the diode can be prevented, which has not been heretofore obtained.

Further, in Patent Literatures 3, 4, and 6 above, the IC input protection circuit including the diode and the capacitor that are provided in the IC is disclosed, and hence there has been a problem that a surge current flows also through an internal circuit via a parasitic capacitance inside the IC or a power supply line to damage the internal circuit. According to the present invention, the diode and the capacitor are provided outside the input/output IC, and hence a surge current flowing through the capacitor is prevented from routing into the input/output IC. Therefore, there is an effect that the damage of the IC can be prevented.

Second Embodiment

Figure 5:
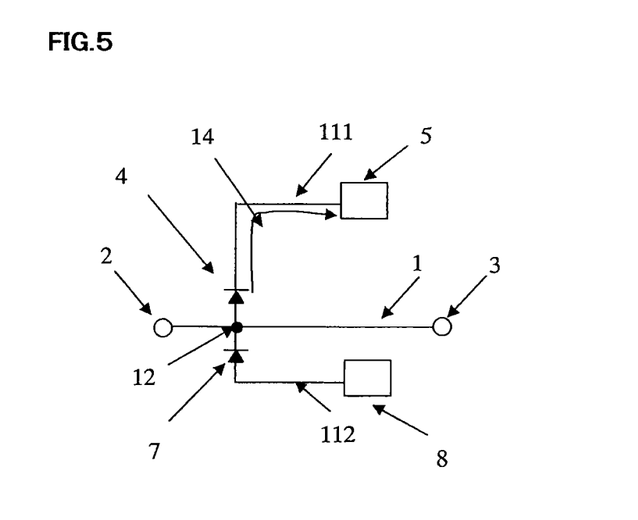
FIG. 5 A diagram illustrating a configuration of a surge absorbing circuit according to a second embodiment of the present invention.

FIG. 5 is a diagram illustrating a configuration of a surge absorbing circuit according to a second embodiment of the present invention. The embodiment illustrated in FIG. 5 is similar to the embodiment illustrated in FIG. 1, but is different in that no capacitor is provided in the vicinities of the first and second diodes 4 and 7. The surge voltage waveform applied to the input terminal 2 is absorbed in a path 14 that reaches the positive power supply 5 via the first diode 4. The resonance frequency of the path 14 is lowered as compared with the case where the capacitor is provided, and hence the overshoot of the surge suppression voltage waveform is increased to reduce the surge voltage suppression effect. However, a high voltage capacitor capable of withstanding a surge voltage can be eliminated.

This configuration can eliminate a high voltage capacitor against surge noise having a long risetime and a low frequency band such as a lightning impulse waveform.

Third Embodiment

In the above-mentioned first and second embodiments, the case where the positive power supply and the negative power supply to be connected to the diodes are specially prepared has been described. However, similar effects can also be obtained with the use of positive and negative voltages of the power supply circuit supplied to the IC (for example, the configuration in which the power supply lines 111 and 112 respectively connected to the positive power supply 5 and the negative power supply 8 of FIG. 1 are connected to a power supply circuit for an IC, such as a power supply circuit 45 of FIG. 9). In this case, in order to reduce an overshoot of a surge suppression waveform caused by the resonance of a power supply pattern of a circuit board which connects the diode and the power supply circuit to each other (see reference numerals 10 and 11 of FIG. 2), it is necessary that a capacitor be mounted so as to be closest to the diode. As the positive and negative voltages, a digital power supply of a digital circuit or an analog power supply of an analog circuit can be used.

With this configuration, the overshoot of the surge suppression voltage can be reduced without providing an additional power supply for the surge absorbing circuit.

Fourth Embodiment

Figure 6:
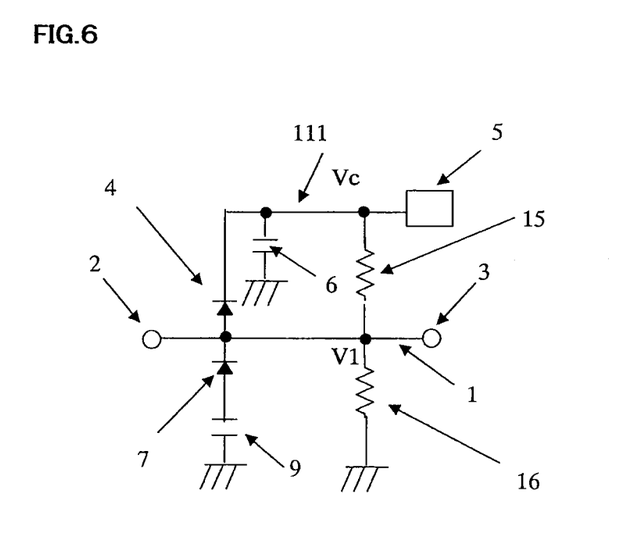
FIG. 6 A diagram illustrating a configuration of a surge absorbing circuit according to a fourth embodiment of the present invention.

FIG. 6 is a diagram illustrating a configuration of a surge absorbing circuit according to a fourth embodiment of the present invention. In each of the above-mentioned embodiments, two power supplies, a positive power supply and a negative power supply, are prepared. However, in FIG. 6, the positive power supply 5 serves as the power supply of the surge absorbing circuit. In FIG. 6, the voltage Vc of the positive power supply 5 is divided by a voltage dividing resistor 15 and a voltage dividing resistor 16 to obtain a DC voltage V1 of the signal line 1. The first diode 4 is biased by Vc−V1 in the reverse direction, and the second diode 7 is biased by V1 in the reverse direction. In the state in which no surge noise is applied, both the diodes 4 and 7 are in the OFF state, and the high frequency signal is directly transmitted. When a positive surge voltage waveform exceeding Vc−V1 and a negative surge voltage waveform exceeding V1 are applied, the diodes 4 and 7 are respectively turned ON, and the surge waveforms (current, voltage) can be absorbed in the respective paths that reach the ground via the capacitors 6 and 9 similarly to the first embodiment.

With this configuration, the surge voltage waveform can be suppressed without providing a negative power supply.

Figure 7:
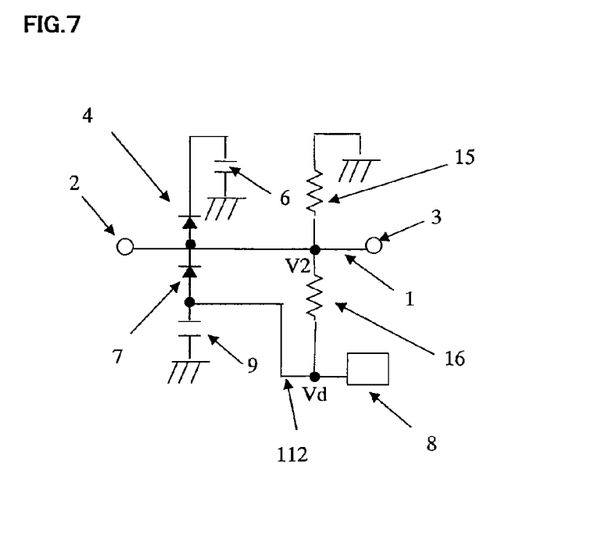
FIG. 7 A diagram illustrating another configuration of the surge absorbing circuit according to the fourth embodiment of the present invention.

Note that, the example in which only the positive power supply is used has been described, but, as illustrated in FIG. 7, a negative power supply 8 may serve as the power supply and a voltage Vd of the negative power supply 8 may be divided by the voltage dividing resistor 15 and the voltage dividing resistor 16 to obtain a DC voltage V2 of the signal line 1.

In FIG. 7, the voltage Vd (negative voltage) of the negative power supply 8 is divided by the voltage dividing resistor 15 and the voltage dividing resistor 16 to obtain the DC voltage V2 of the signal line 1. Thus, V2 is a negative voltage. The first diode 4 is biased by V2−GND in the reverse direction, and the second diode 7 is biased by Vd−V2 in the reverse direction. In the state in which no surge noise is applied, both the diodes 4 and 7 are in the OFF state, and the high frequency signal is directly transmitted. When a positive surge voltage waveform exceeding −V2 (positive voltage) and a negative surge voltage waveform exceeding Vd−V2 (negative voltage) are applied, the diodes 4 and 7 are respectively turned ON, and the surge waveforms (current, voltage) can be absorbed in the respective paths that reach the ground via the capacitors 6 and 9 similarly to the first embodiment.

With this configuration, the surge voltage waveform can be suppressed without providing a positive power supply.

Fifth Embodiment

Figure 8:
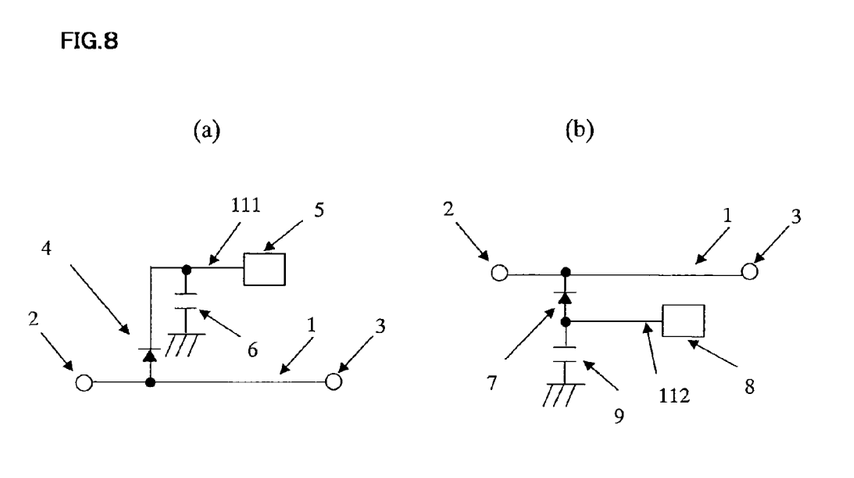
FIG. 8 Diagrams illustrating a configuration of a surge absorbing circuit according to a fifth embodiment of the present invention.

FIG. 8 are diagrams illustrating a configuration of a surge absorbing circuit according to a fifth embodiment of the present invention. In each of the above-mentioned embodiments, the surge absorbing circuit in which two diodes are connected to the signal line 1 has been described. Alternatively, however, as illustrated in FIG. 8, the surge absorbing circuit may be constituted by one diode. In FIG. 8(a), the upper configuration of FIG. 1 is provided, and the first diode 4, the positive power supply 5, and the first capacitor 6 are provided. In FIG. 8(b), the lower configuration of FIG. 1 is provided, and the second diode 7, the negative power supply 8, and the second capacitor 9 are provided. In this way, a positive surge waveform can be absorbed in the case of FIG. 8(a), and a negative surge waveform can be absorbed in the case of FIG. 8(b).

With this configuration, the surge absorbing circuit is installed in the place at which the polarity of the surge voltage waveform is fixed, and hence the surge absorbing circuit can be downsized.

Sixth Embodiment

Figure 9:
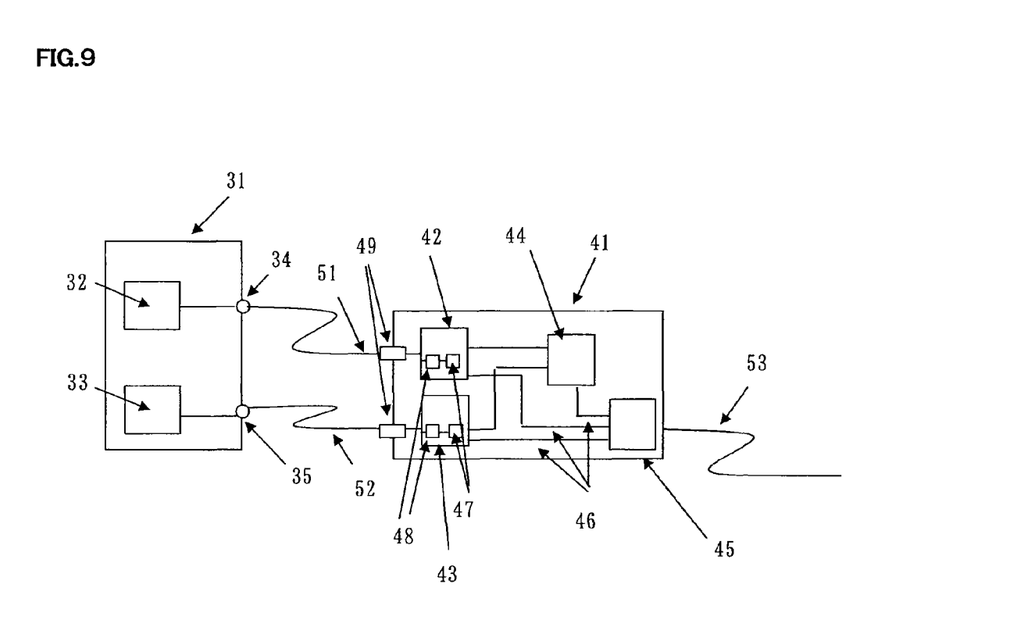
FIG. 9 A diagram illustrating an example of a configuration of an electronic device according to a sixth embodiment of the present invention to which the surge absorbing circuit according to each embodiment of the present invention is applied.

FIG. 9 illustrates an example of a configuration of an electronic device according to the present invention to which the surge absorbing circuit according to each of the above-mentioned embodiments is applied. In FIG. 9, reference numeral 31 denotes a device to be controlled such as an electric power device or a factory automation (FA) device, and reference numeral 41 denotes a control device as an electronic device for controlling the device to be controlled 31, for example.

The device to be controlled 31 includes a sensor circuit 32 and a drive device 33 such as a breaker or a motor. The sensor circuit 32 is connected to a sensor terminal 34 via a signal line, and the drive device 33 is connected to a control terminal 35 via a control line.

The control device 41 includes an input circuit 42 to which a sensor signal from the device to be controlled 31 is input, an output circuit 43 for outputting a control signal to the device to be controlled 31, a control circuit 44 for detecting and processing the sensor signal from the input circuit 42 and outputting a control signal to the output circuit 43, and a power supply circuit 45 for supplying necessary voltages to the respective circuits 42 to 44. The supply of voltages from the power supply circuit 45 to the input circuit 42, the output circuit 43, and the control circuit 44 is performed via a power supply line 46. The input circuit 42 and the output circuit 43 are each formed of an input/output IC 47, and actually, the surge absorbing circuit 48 according to any one of the first to fifth embodiments described above and seventh to ninth embodiments described below is connected between an input/output cable 51 or 52 and the input/output IC 47.

Input/output connectors 49 are mounted to the control device 41 and are connected to the input circuit 42 and the output circuit 43, respectively. As the input/output connector 49, a coaxial connector such as a BNC connector or a multi-pin connector is used. In the case of changing the configuration of the device to be controlled 31, the input/output cables 51 and 52 are attached or detached to or from the input/output connectors 49. In attaching or detaching the cable, electrostatic noise is induced into the input/output connector 49 to generate a large surge voltage waveform at a connector portion (49), or a surge voltage waveform generated by the device to be controlled 31 is applied to the input/output circuit (42, 43) via the connector portion or the like. During the attachment/detachment of the connector, metal contacts in the input/output connector 49 are not completely brought into contact with each other, and hence a contact resistance of the connector is increased. When the surge absorbing circuit 48 is installed inside the input/output connector 49, the surge voltage cannot be reduced enough because of the contact resistance. As illustrated in FIG. 9, the surge absorbing circuit 48 is installed in the board at a distance from the input/output connector 49, and hence the surge voltage waveform generated during the attachment/detachment of the connector can be reduced enough. The surge absorbing circuit 48 is mounted on the input/output IC 47 side of the signal line between the input/output connector 49 and the input/output IC 47, and hence there is an effect that the surge voltage waveform generated during the attachment/detachment of the connector can be reduced enough.

In Patent Literature 5 above, the diode is provided inside the input/output connector, and hence electrostatic noise or a surge voltage waveform generated during the attachment/detachment of the connector cannot be suppressed. According to the present invention, on the other hand, the surge absorbing circuit is provided outside the connector, and hence there is an effect that the electrostatic noise or the surge voltage waveform generated during the attachment/detachment of the connector can be suppressed.

The sensor terminal 34 and the input circuit 42 are connected to each other via the input cable 51, and the control terminal 35 and the output circuit 43 are connected to each other via the output cable 52. The power supply circuit 45 is connected to a power supply cable 53. The sensor signal and the control signal are analog signals or digital signals, and the amplitude of the signals is 1 V to 5 V. The voltages supplied from the power supply circuit 45 are +2 V to +15 V or −2 V to −15 V. The breakdown voltage of the input/output IC 47 that deals with such signals is 10 V, which is about twice the input signal. Accordingly, when a surge voltage of 10 V or more is applied to the input/output circuit (42, 43), the input/output IC 47 is damaged. On the other hand, a surge voltage generated by the device to be controlled 31 such as an electric power device or an FA device is several kV, and the surge voltage can be attenuated to about 1 kV by a nonlinear voltage element (not shown) such as a varistor or an arrester mounted to the sensor terminal 34 or the control terminal 35 on the device to be controlled 31 side. This surge voltage reaches the input circuit 42 or the output circuit 43 via the input cable 51 or the output cable 52.

Figure 10:
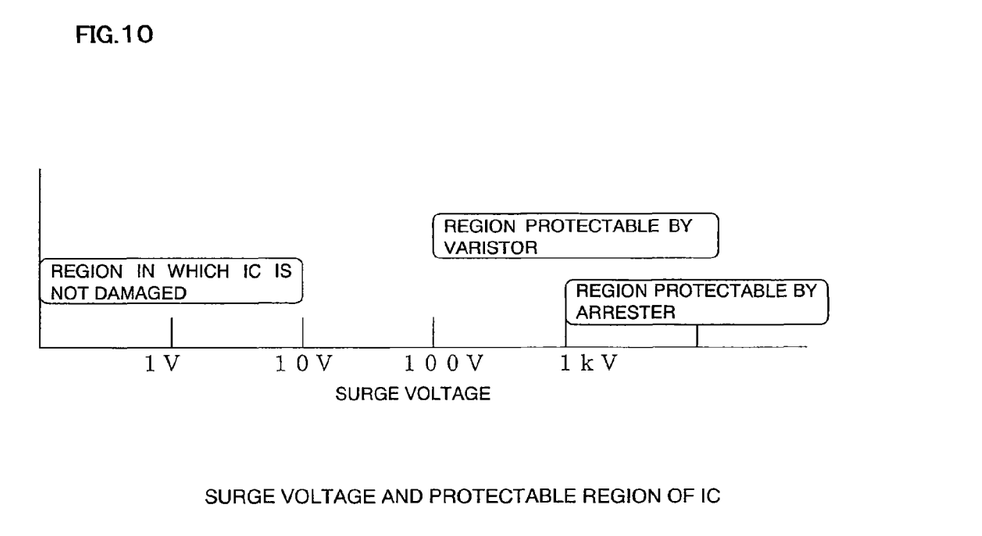
FIG. 10 A diagram for describing a relationship between a surge voltage and a protectable region of an IC in the present invention.

In the case where the surge voltage that has reached the input circuit 42 or the output circuit 43 is about 1 kV, an arrester may be mounted also on the input circuit 42 side or the output circuit 43 side to reduce the surge voltage to several V or less. However, attenuation in the input cable 51 or the output cable 52 is large, and hence when the surge voltage that has reached the input circuit 42 or the output circuit 43 becomes 100 V or less, the surge voltage cannot be suppressed because the operating voltage of the varistor that does not affect a high frequency signal is as high as 100 V or more. This relationship is shown in FIG. 10. When the surge voltage is 1 kV or more, the input/output IC 47 can be protected by an arrester. When the surge voltage is 100 V or more, the input/output IC 47 can be protected by a varistor. When the surge voltage is 10 V or less, the input/output IC 47 is not damaged. Therefore, if a surge voltage of 10 V to 100 V is applied to the signal line having a signal amplitude of 1 V to 5 V, the input/output IC 47 in the circuit is easily broken down.

When the surge absorbing circuit 48 according to any one of the above-mentioned first to fifth embodiments is connected between the input/output cable (51, 52) and the input/output IC 47, a surge voltage larger than the reverse bias voltage applied to the diode of the surge absorbing circuit 48 can be completely suppressed. Accordingly, the input/output circuit (42, 43) can be protected from a surge voltage of several V to several kV, more specifically, a surge voltage of 10 V or more and 100 V or less, for example. As described above, the voltage suppression effect is exerted on any surge voltage of several V or more, and hence it is possible to protect an electronic device which may be applied with surge voltages of various voltage levels.

In FIG. 9, the power supply circuit 45 produces the voltage necessary in the circuit board of the control device 41 by a DC-DC converter or the like. The power supply circuit 45 is disposed on the circuit board on the power supply cable 53 side while the input/output circuit (42, 43) is disposed on the circuit board on the input/output cable (51, 52) side. Therefore, the power supply circuit 45 and the input/output circuit (42, 43) are disposed to be opposed to each other on the circuit board, and hence the length of the power supply line 46 for supplying a predetermined voltage from the power supply circuit 45 to the input/output circuit (42, 43) is substantially the same as the size of the board, specifically, 100 mm to 300 mm. The inductance of the power supply line 46 or the power supply pattern in the circuit board (see reference numerals 10 and 11 of FIG. 2) is several tens of nH to several hundreds of nH.

On the other hand, a surge voltage waveform having a risetime of several ns to several tens of ns has a frequency component reaching 100 MHz to 1 GHz, and hence the impedance of the inductance of the power supply line 46 or the power supply patterns 10 and 11 (several tens of nH to several hundreds of nH) is several tens of Ω. This impedance is larger than an impedance of several Ω determined when the diode of the surge absorbing circuit 48 is turned ON, and hence the surge voltage cannot be suppressed enough. Therefore, as illustrated in FIG. 2, the capacitors (6a to 6c, 9a to 9c) are mounted on the diode side of the power supply line or the power supply patterns 10 and 11, and hence the surge voltage can be completely suppressed. Therefore, with the use of the surge absorbing circuit, a surge voltage of 10 V to 100 V induced in the signal line having a signal frequency of 100 MHz to 1 GHz and a signal amplitude of 1 V to 5 V can be completely suppressed.

With the configuration described above, the surge voltage can be completely suppressed with respect to the surge voltage waveform of 10 V to 100 V induced in the signal line having a signal frequency of 100 MHz to 1 GHz and a signal amplitude of 1 V to 5 V, irrespective of the size of the circuit board of the electronic circuit.

Seventh Embodiment

Figure 11:
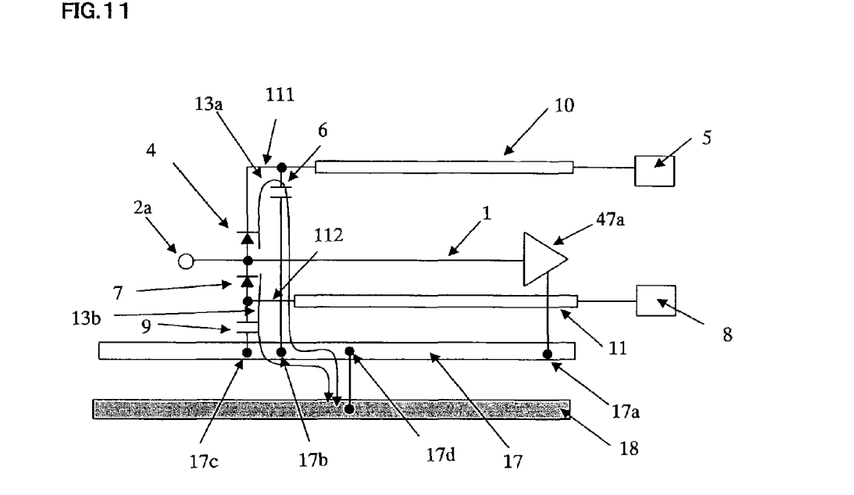
FIG. 11 A diagram illustrating a configuration of the periphery of a surge absorbing circuit of an electronic device according to a seventh embodiment of the present invention.

FIG. 11 is a diagram illustrating a configuration of the periphery of a surge absorbing circuit of an electronic device according to a seventh embodiment of the present invention. First, in the following embodiments, the surge absorbing circuit is formed and mounted on an electronic device such as the input circuit 42 or the output circuit 43 of the control device 41 of FIG. 9 on the same circuit board together with another circuit. In FIG. 11, the signal line 1 is connected to, for example, an input/output IC 47a corresponding to the input/output IC 47 of FIG. 9. When the input/output IC 47a is an input IC, an input terminal 2a is provided. When the input/output IC 47a is an output IC, an output terminal 2a is provided. Reference numeral 10 denotes a power supply pattern constituting a power supply line of the circuit board that connects the positive power supply 5 and the first capacitor 6 to each other. Reference numeral 11 denotes a power supply pattern of a power supply line of the circuit board that connects the negative power supply 8 and the second capacitor 9 to each other. Reference numeral 17 denotes a ground pattern constituting the ground of the circuit board. Reference numeral 18 denotes a metal portion outside the circuit board (a metal case for accommodating the control device 41 illustrated in FIG. 9 or a ground metal plate portion), which is called frame ground (FG).

The first diode 4 has an anode connected to the signal line 1 and a cathode connected to the positive power supply 5 via the power supply pattern 10 so that a reverse bias is applied from the positive power supply 5. The first capacitor 6 is connected between the ground pattern 17 and a connection point on the power supply line 111 between the cathode of the first diode 4 and the power supply pattern 10 so as to be closest to the first diode 4. The second diode 7 has a cathode connected to the signal line 1 and an anode connected to the negative power supply 8 via the power supply pattern 11 so that a reverse bias is applied from the negative power supply 8. The second capacitor 9 is connected between the ground pattern 17 and a connection point on the power supply line 112 between the anode of the second diode 7 and the power supply pattern 11 so as to be closest to the second diode 7.

Reference numeral 17a on the ground pattern 17 denotes a connection point to the input/output IC 47a, reference numeral 17b denotes a connection point to the first capacitor 6, reference numeral 17c denotes a connection point to the second capacitor 9, and reference numeral 17d denotes a connection point to the metal portion 18 (the ground pattern 17 is connected to the respective elements via connection lines or directly). The connection point 17d to the metal portion 18 is provided between the connection points 17b and 17c of the respective capacitors 6 and 9 and the connection point 17a to the input/output IC 47a.

When the surge voltage is applied to the input terminal 2 and the first diode 4 becomes the "ON" state, the surge waveform (current, voltage) is absorbed in a path 13a. The surge current flows into the place of the metal portion 18 having a stable potential provided outside the circuit board. Therefore, the surge waveform never enters the IC from the ground 17a of the input/output IC 47a connected to the ground pattern 17. Similarly, when the second diode 7 is turned "ON", the surge waveform is absorbed in a path 13b, and the surge waveform never enters the IC from the ground of the input/output IC 47a connected to the ground pattern 17.

Figure 12:
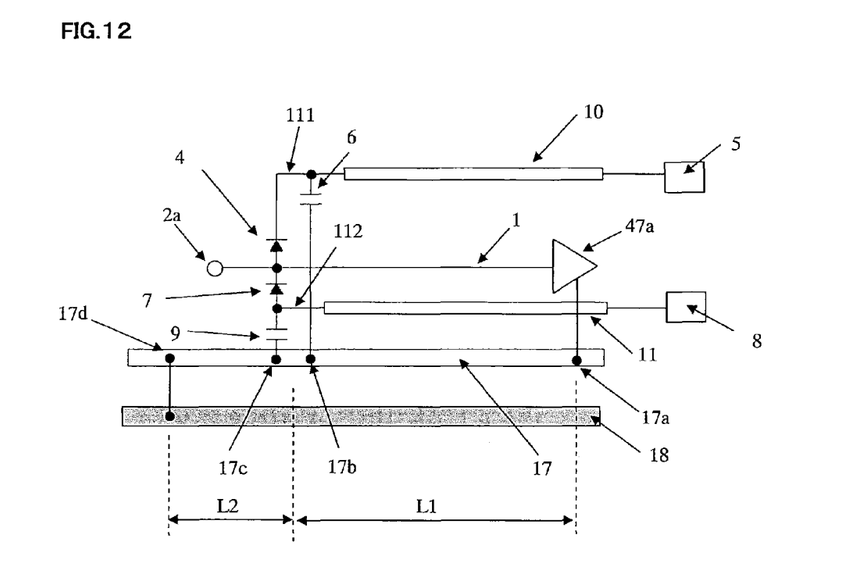
FIG. 12 A diagram illustrating a modified example of the electronic device of FIG. 11.

Note that, in the example illustrated in FIG. 11, the connection point 17d to the metal portion 18 outside the circuit board is provided between the connection points 17b and 17c on the ground pattern to the respective capacitors 6 and 9 and the connection point 17a to the input/output IC 47a. Alternatively, however, as illustrated in FIG. 12, even when the connection point 17d to the metal portion 18 is provided outside the region between the connection points to the capacitors 6 and 9 (for example, an intermediate point between the connection points 17b and 17c) and the connection point 17a to the input/output IC 47a so that a distance L2 between the connection points to the capacitors 6 and 9 (the intermediate point between the connection points 17b and 17c) and the connection point 17d to the metal portion 18 becomes smaller than a distance L1 between the connection points to the capacitors 6 and 9 (for example, the intermediate point between the connection points 17b and 17c) and the connection point 17a to the input/output IC 47a, the same effect can be obtained.

With the configuration described above, there is an effect that the surge current flowing through the capacitor can be prevented from entering the IC via the ground pattern of the circuit board to damage the IC or cause a malfunction.

Eighth Embodiment

Figure 13:
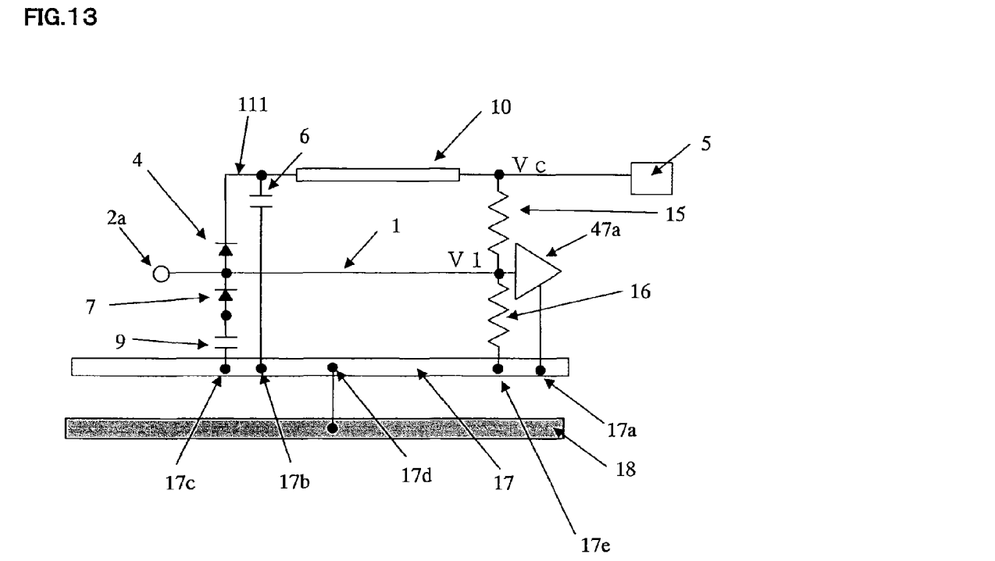
FIG. 13 A diagram illustrating a configuration of the periphery of a surge absorbing circuit of an electronic device according to an eighth embodiment of the present invention.

FIG. 13 is a diagram illustrating a configuration of the periphery of a surge absorbing circuit of an electronic device according to an eighth embodiment of the present invention. In this embodiment, the surge absorbing circuit according to the seventh embodiment is used, and the positive power supply 5 serves as the power supply of the surge absorbing circuit similarly to the example of FIG. 6 of the fourth embodiment. The voltage dividing resistor 15 and the voltage dividing resistor 16 divide the voltage Vc of the positive power supply 5 to obtain the DC voltage V1 of the signal line 1. The voltage dividing resistor 15 has one end connected to the power supply pattern 10 on the power supply side. A connection point between the series-connected voltage dividing resistors 15 and 16 is connected to the signal line 1. The voltage dividing resistor 16 has the other end connected to the ground pattern 17 at a connection point 17e in proximity of the connection point 17a of the input/output IC 47a. The second diode 7 has an anode connected to the ground pattern 17 via the second capacitor 9. The second capacitor 9 is connected most closely to the second diode 7.

When a positive surge voltage exceeding Vc−V1 and a negative surge voltage exceeding V1 are applied, the respective diodes 4 and 7 are turned ON, and the surge waveform (current, voltage) can be absorbed in the respective paths that reach the ground via the capacitors 6 and 9 as described in the fourth embodiment. The voltage dividing resistors 15 and 16 are provided on the power supply side of the power supply pattern 10, and hence the surge waveform can be prevented from reaching the input/output IC 47a via the voltage dividing resistors 15 and 16.

With this configuration, the surge voltage waveform can be suppressed without providing a negative power supply.

Figure 14:
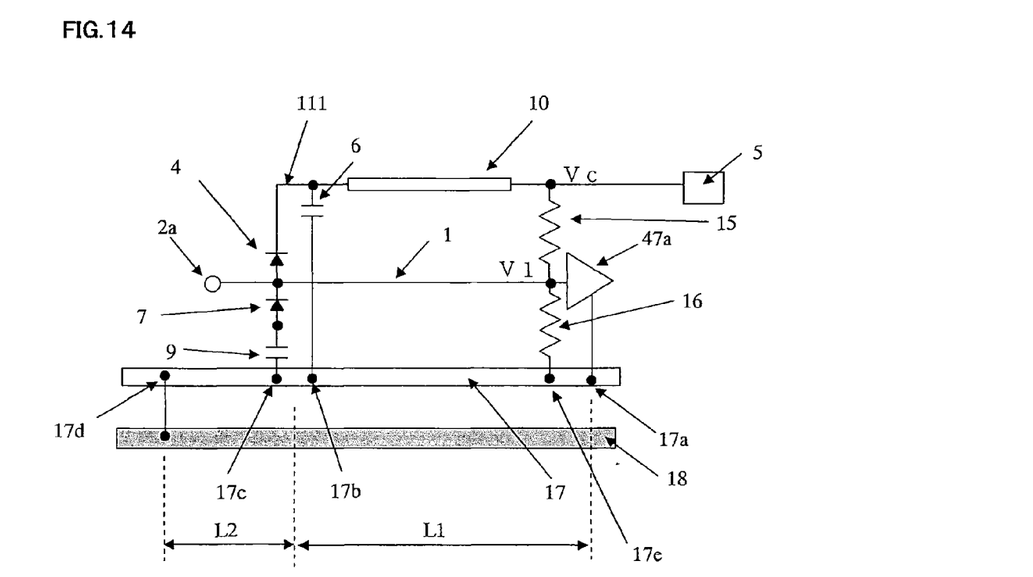
FIG. 14 A diagram illustrating a modified example of the electronic device of FIG. 13.

Note that, as in the seventh embodiment, as illustrated in FIG. 14, even when the connection point 17d to the metal portion 18 is provided outside the region between the connection points to the capacitors 6 and 9 (for example, an intermediate point between the connection points 17b and 17c) and the connection point 17a to the input/output IC 47a so that a distance L2 between the connection points to the capacitors 6 and 9 (for example, the intermediate point between the connection points 17b and 17c) and the connection point 17d to the metal portion 18 becomes smaller than a distance L1 between the connection points to the capacitors 6 and 9 (for example, the intermediate point between the connection points 17b and 17c) and the connection point 17a to the input/output IC 47a, the same effect can be obtained.

With the configuration described above, there is an effect that the surge current flowing through the capacitor can be prevented from entering the IC via the ground pattern or the voltage dividing resistors of the circuit board to damage the IC or cause a malfunction.

Ninth Embodiment

Figure 15:
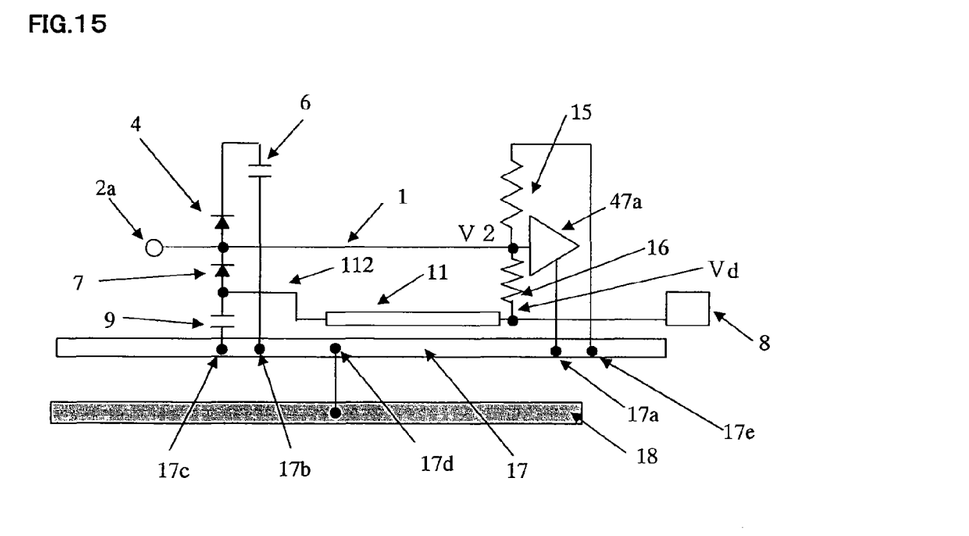
FIG. 15 A diagram illustrating a configuration of the periphery of a surge absorbing circuit of an electronic device according to a ninth embodiment of the present invention.

FIG. 15 is a diagram illustrating a configuration of the periphery of a surge absorbing circuit of an electronic device according to a ninth embodiment of the present invention. In this embodiment, the surge absorbing circuit according to the seventh embodiment is used, and the negative power supply 8 serves as the power supply of the surge absorbing circuit similarly to the example of FIG. 7 of the fourth embodiment. The voltage dividing resistor 15 and the voltage dividing resistor 16 divide the voltage Vd of the negative power supply 8 to obtain the DC voltage V2 of the signal line 1. The voltage dividing resistor 15 has one end connected to the ground pattern 17 at the connection point 17e in proximity to the connection point 17a of the input/output IC 47a. A connection point between the series-connected voltage dividing resistors 15 and 16 is connected to the signal line 1. The voltage dividing resistor 16 has the other end connected to the power supply pattern 11 on the power supply side. The first diode 4 has a cathode connected to the ground pattern 17 via the first capacitor 6 at the connection point 17b. The first capacitor 6 is connected most closely to the first diode 4.

When a positive surge voltage exceeding −V2 (positive voltage) and a negative surge voltage waveform exceeding Vd−V2 (negative voltage) are applied, the respective diodes 4 and 7 are turned ON, and the surge waveform (current, voltage) can be absorbed in the respective paths that reach the ground via the capacitors 6 and 9 as described in the fourth embodiment. The voltage dividing resistors 15 and 16 are provided on the power supply side of the power supply pattern 11, and hence the surge waveform can be prevented from reaching the input/output IC 47a via the voltage dividing resistors 15 and 16.

With this configuration, the surge voltage waveform can be suppressed without providing a negative power supply.

Figure 16:
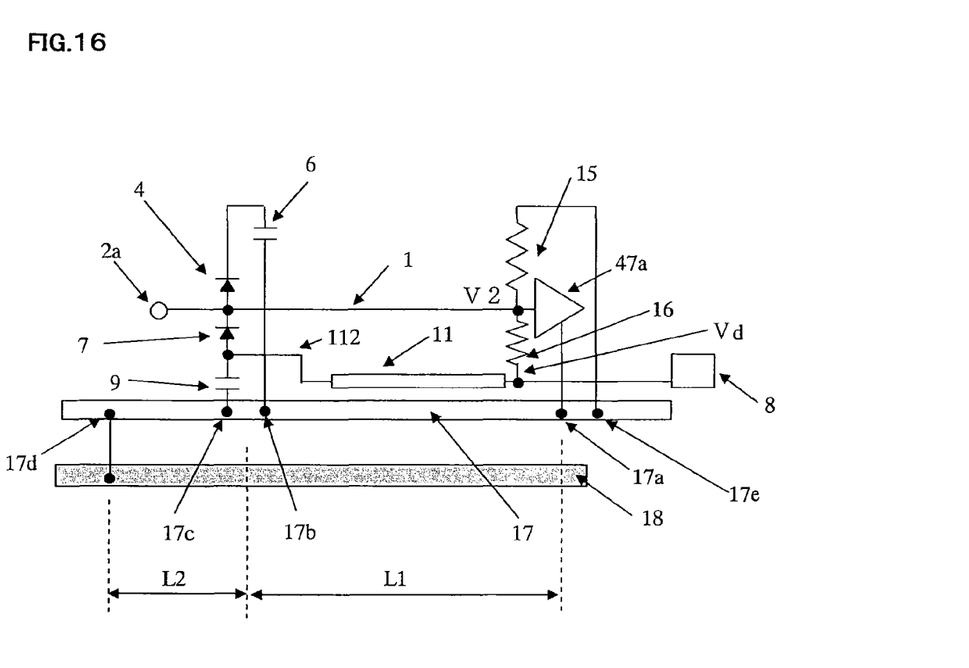
FIG. 16 A diagram illustrating a modified example of the electronic device of FIG. 15.

Note that, as in the seventh embodiment, as illustrated in FIG. 16, even when the connection point 17d to the metal portion 18 is provided outside the region between the connection points to the capacitors 6 and 9 (for example, an intermediate point between the connection points 17b and 17c) and the connection point 17a to the input/output IC 47a so that a distance L2 between the connection points to the capacitors 6 and 9 (the intermediate point between the connection points 17b and 17c) and the connection point 17d to the metal portion 18 becomes smaller than a distance L1 between the connection points to the capacitors 6 and 9 (for example, the intermediate point between the connection points 17b and 17c) and the connection point 17a to the input/output IC 47a, the same effect can be obtained.

With the configuration described above, there is an effect that the surge current flowing through the capacitor can be prevented from entering the IC via the ground pattern or the voltage dividing resistors of the circuit board to damage the IC or cause a malfunction.

It should be understood that, when the surge absorbing circuit described in each of the seventh to ninth embodiments is provided on the input/output IC side of the signal line between the input/output connector 49 and the input/output IC (47) as described in the sixth embodiment (see the surge absorbing circuit 48 of FIG. 9), the effect of sufficiently reducing the surge voltage waveform during the attachment/detachment of the connector can be obtained.

It should be understood that the present invention is not limited to each of the above-mentioned embodiments and encompasses all possible combinations of the above-mentioned embodiments.

INDUSTRIAL APPLICABILITY

The surge absorbing circuit according to the present invention is applicable to electronic devices in various fields.

REFERENCE SIGNS LIST 1 signal line, 2, 2a input terminal, 3 output terminal, 4 first diode, 5 positive power supply, 6, 6a to 6c first capacitor, 7 second diode, 8 negative power supply, 9, 9a to 9c second capacitor, 10, 11 power supply pattern, 12 diode connection point, 13, 13a, 13b, 14 path, 15, 16 voltage dividing resistor, 17 ground pattern, 17a to 17e connection point, 18 metal portion, 21 input surge waveform, 22 output waveform, 23 input surge waveform, 24 output waveform, 31 device to be controlled, 32 sensor circuit, 33 drive device, 34 sensor terminal, 35 control terminal, 41 control device (electronic device), 42 input circuit, 43 output circuit, 44 control circuit, 45 power supply circuit, 46, 111, 112 power supply line, 48 surge absorbing circuit, 47, 47a input/output IC, 49 input/output connector, 51 input cable, 52 output cable, 53 power supply cable.

The invention claimed is:

1. An electronic device, comprising:
a surge absorbing circuit formed on a circuit board, the surge absorbing circuit comprising at least one surge suppression circuit,
the at least one surge suppression circuit comprising, with respect to the same signal line:
a power supply;
a diode connected between the signal line and the power supply;
a power supply line for connecting the diode and the power supply to each other; and
at least one capacitor connected between the power supply line and a ground;
wherein, in each of the at least one surge suppression circuit, a direction of the diode and a voltage of the power supply with respect to the signal line are determined so that the diode is reversely biased,
wherein the ground is made of a ground pattern on the circuit board,
wherein the signal line includes one end connected to an integrated circuit portion, and
wherein the electronic device includes a connection point to a metal portion other than the circuit board, the connection point being provided between a connection point of each of the at least one capacitor to the ground pattern and a connection point of the integrated circuit portion to the ground pattern.

2. The electronic device according to claim 1, wherein the metal portion comprises a frame ground.

3. The electronic device according to claim 2, wherein, in the surge absorbing circuit, the power supply has one of a positive polarity and a negative polarity, the surge absorbing circuit comprises voltage dividing resistors for dividing the voltage of the power supply between the power supply and the ground to supply the divided voltage to the signal line.

4. The electronic device according to claim 2, wherein the surge absorbing circuit is provided to an input/output circuit portion including a signal line which deals with a signal having a signal frequency of 100 MHz to 1 GHz and a signal amplitude of 1 V to 5 V.

5. The electronic device according to claim 1, wherein the signal line includes another end connected to an input/output connector of the electronic device, and the at least one surge suppression circuit is provided on the integrated circuit portion side of the signal line between the input/output connector and the integrated circuit portion.

6. The electronic device according to claim 5, wherein, in the surge absorbing circuit, the power supply has one of a positive polarity and a negative polarity, the surge absorbing circuit comprises voltage dividing resistors for dividing the voltage of the power supply between the power supply and the ground to supply the divided voltage to the signal line.

7. The electronic device according to claim 5, wherein the surge absorbing circuit is provided to an input/output circuit portion including a signal line which deals with a signal having a signal frequency of 100 MHz to 1 GHz and a signal amplitude of 1 V to 5V.

8. The electronic device according to claim 1, wherein, in the surge absorbing circuit, the power supply has one of a positive polarity and a negative polarity, the surge absorbing circuit comprises voltage dividing resistors for dividing the voltage of the power supply between the power supply and the ground to supply the divided voltage to the signal line.

9. The electronic device according to claim 8, wherein the surge absorbing circuit is provided to an input/output circuit portion including a signal line which deals with a signal having a signal frequency of 100 MHz to 1 GHz and a signal amplitude of 1 V to 5 V.

10. The electronic device according to claim 1, wherein the surge absorbing circuit is provided to an input/output circuit portion including a signal line which deals with a signal having a signal frequency of 100 MHz to 1 GHz and a signal amplitude of 1 V to 5 V.

11. An electronic device, comprising:
a surge absorbing circuit formed on a circuit board, the surge absorbing circuit comprising at least one surge suppression circuit,
the at least one surge suppression circuit comprising, with respect to the same signal line:
a power supply;
a diode connected between the signal line and the power supply;
a power supply line for connecting the diode and the power supply to each other; and
at least one capacitor connected between the power supply line and a ground;

wherein, in each of the at least one surge suppression circuit, a direction of the diode and a voltage of the power supply with respect to the signal line are determined so that the diode is reversely biased, wherein the ground is made of a ground pattern on the circuit board, wherein the signal line includes one end connected to an integrated circuit portion, and wherein the electronic device includes a connection point to a metal portion other than the circuit board, the connection point being provided at a position outside a region between a connection point of each of the at least one capacitor to the ground pattern and a connection point of the integrated circuit portion to the ground pattern, the position having a distance between the connection point of the each of the at least one capacitor to the ground pattern and the connection point to the metal portion other than the circuit board smaller than a distance between the connection point of the each of the at least one capacitor to the ground pattern and the connection point of the integrated circuit portion to the ground pattern.

12. The electronic device according to claim 11, wherein the metal portion comprises a frame ground.

13. The electronic device according to claim 12, wherein, in the surge absorbing circuit, the power supply has one of a positive polarity and a negative polarity, the surge absorbing circuit comprises voltage dividing resistors for dividing the voltage of the power supply between the power supply and the ground to supply the divided voltage to the signal line.

14. The electronic device according to claim 12, wherein the surge absorbing circuit is provided to an input/output circuit portion including a signal line which deals with a signal having a signal frequency of 100 MHz to 1 GHz and a signal amplitude of 1 V to 5 V.

15. The electronic device according to claim 11, wherein the signal line includes another end connected to an input/output connector of the electronic device, and the at least one surge suppression circuit is provided on the integrated circuit portion side of the signal line between the input/output connector and the integrated circuit portion.

16. The electronic device according to claim 15, wherein, in the surge absorbing circuit, the power supply has one of a positive polarity and a negative polarity, the surge absorbing circuit comprises voltage dividing resistors for dividing the voltage of the power supply between the power supply and the ground to supply the divided voltage to the signal line.

17. The electronic device according to claim 15, wherein the surge absorbing circuit is provided to an input/output circuit portion including a signal line which deals with a signal having a signal frequency of 100 MHz to 1 GHz and a signal amplitude of 1 V to 5 V.

18. The electronic device according to claim 11, wherein, in the surge absorbing circuit, the power supply has one of a positive polarity and a negative polarity, the surge absorbing circuit comprises voltage dividing resistors for dividing the voltage of the power supply between the power supply and the ground to supply the divided voltage to the signal line.

19. The electronic device according to claim 18, wherein the surge absorbing circuit is provided to an input/output circuit portion including a signal line which deals with a signal having a signal frequency of 100 MHz to 1 GHz and a signal amplitude of 1 V to 5 V.

20. The electronic device according to claim 11, wherein the surge absorbing circuit is provided to an input/output circuit portion including a signal line which deals with a signal having a signal frequency of 100 MHz to 1 GHz and a signal amplitude of 1 V to 5 V.

* * * * *